United States Patent
Tanabe

(10) Patent No.: US 7,406,881 B2
(45) Date of Patent: Aug. 5, 2008

(54) TOUCH PANEL AND MANUFACTURING METHOD FOR THE SAME

(75) Inventor: Koji Tanabe, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 117 days.

(21) Appl. No.: 11/453,505

(22) Filed: Jun. 15, 2006

(65) Prior Publication Data

US 2006/0283267 A1    Dec. 21, 2006

(30) Foreign Application Priority Data

Jun. 20, 2003   (JP) ............................. 2005-178775

(51) Int. Cl.
    *G01D 7/00* (2006.01)
(52) U.S. Cl. ..................... 73/862.041; 73/862.046; 73/862.626
(58) Field of Classification Search ............ 73/862.041, 73/862.046, 862.626
    See application file for complete search history.

(56) References Cited

U.S. PATENT DOCUMENTS

| | | | | | |
|---|---|---|---|---|---|
| 4,529,959 | A | * | 7/1985 | Ito et al. ................... | 338/295 |
| 4,570,149 | A | * | 2/1986 | Thornburg et al. .......... | 338/114 |
| 4,644,101 | A | * | 2/1987 | Jin et al. .................. | 178/18.05 |
| 5,008,497 | A | * | 4/1991 | Asher ....................... | 178/18.05 |
| 5,060,527 | A | * | 10/1991 | Burgess .................... | 73/862.68 |
| 5,451,724 | A | * | 9/1995 | Nakazawa et al. .......... | 178/18.05 |
| 5,515,738 | A | * | 5/1996 | Tamori ..................... | 73/862.46 |
| 6,310,614 | B1 | * | 10/2001 | Maeda et al. ............... | 345/173 |
| 6,639,163 | B2 | * | 10/2003 | Fukui et al. ................ | 200/512 |
| 6,784,948 | B2 | | 8/2004 | Kawashima et al. | |
| 6,809,280 | B2 | * | 10/2004 | Divigalpitiya et al. ...... | 200/512 |
| 6,847,355 | B1 | * | 1/2005 | Nishikawa et al. .......... | 345/173 |
| 6,849,335 | B2 | * | 2/2005 | Igarashi et al. ............. | 428/403 |
| 7,067,756 | B2 | * | 6/2006 | Cok ......................... | 200/512 |
| 7,095,241 | B2 | * | 8/2006 | Setaka et al. ............... | 324/754 |
| 2006/0096392 | A1 | * | 5/2006 | Inkster et al. ............. | 73/862.041 |

FOREIGN PATENT DOCUMENTS

JP            59-188726 A         10/1984

\* cited by examiner

*Primary Examiner*—Edward Lefkowitz
*Assistant Examiner*—Freddie Kirkland, III
(74) *Attorney, Agent, or Firm*—RatnerPrestia

(57) ABSTRACT

A touch panel has an upper substrate, a lower substrate, an elastic layer, plural conducting wires, and a gel layer. An upper conductive layer is formed at a lower surface of the upper substrate, a lower conductive layer that faces the upper conductive layer with a gap in between is formed at a top surface of the lower substrate, and the elastic layer is formed at a top surface of the lower conductive layer. The conductive wires are partially buried in the elastic layer and are disposed in a manner vertically oriented with a gap from the upper conductive layer. The gel layer is formed between the upper conductive layer and the elastic layer. With this construction, the touch panel is obtainable that suffers less wrong operation and allows reliable operation.

10 Claims, 3 Drawing Sheets

TOUCH PANEL AND MANUFACTURING METHOD FOR THE SAME

BACKGROUND OF THE INVENTION

1. Field of the Invention

The present invention relates to touch panels to be used for operation of various types of electronic equipments and manufacturing method for the same.

2. Background Art

In recent years, optically transparent touch panels are installed on the front surface of display devices such as liquid crystal display in a variety of electronic equipment such as mobile phones and car navigation systems. Through touch panels, visual identification of characters and symbols displayed on the screen can be made. Also, through touch panels, selection of the characters and the symbols can be made. Furthermore, touch panels are operated by depressing them with a finger or a thing such as a dedicated pen. With this operation, each function of electronic equipment can be switched. Accordingly, touch panels that suffer less wrong operation and are easy to operate are required.

A description of such a conventional touch panel will be given referring to FIG. 4.

FIG. 4 is a cross-sectional view of a conventional touch panel. In FIG. 4, optically transparent upper substrate 101 is in the form of a film. Optically transparent lower substrate 102 is formed of glass and the like. Optically transparent upper conductive layer 103 made of indium tin oxide and the like is formed at the lower surface of upper substrate 101. Optically transparent lower conductive layer 104 made of indium tin oxide and the like is formed at a top surface of lower substrate 102.

In addition, optically transparent elastic layer 105 made of silicone rubber, urethane rubber and the like is formed at a space between upper conductive layer 103 and lower conductive layer 104. Two or more conductive wires 106 made of nickel, stainless steel or the like are disposed in a manner vertically oriented and buried inside elastic layer 105. Bottom ends of conductive wires 106 are in contact with lower conductive layer 104. A predetermined space is provided between top ends of conductive wires 106 and upper conductive layer 103.

Furthermore, a pair of upper electrodes (not shown) is formed at both ends of upper conductive layer 103. A pair of lower electrodes (not shown) is formed at both ends of lower conductive layer 104 in a direction orthogonal to the upper electrodes. Touch panel 100 is constructed in this way.

Electronic equipment (not shown) is constructed by disposing touch panel 100 constructed in this way on the front surface of a liquid crystal display device (not shown), for example. At the same time, the pair of upper electrodes and the pair of lower electrodes are connected to an electronic circuit (not shown) of the electronic equipment, respectively.

In the above configuration, a top surface of upper substrate 101 is depressed with a finger or a thing such as pen in the direction of arrow X while visually confirming what is displayed on the liquid crystal display device, for example, on a back of touch panel 100. With this operation, upper substrate 101 and elastic layer 105 are bent, and that part of upper conductive layer 103 which is depressed and the top ends of conductive wires 106 come into contact together. When upper substrate 101 is further depressed, conductive wires 106 are bent. At this result, upper conductive layer 103 and lower conductive layer 104 are electrically connected via conductive wires 106.

And, an electrical power supplied from the electronic circuit is sequentially fed to the upper electrodes and the lower electrodes. The electronic circuit detects a location of depression based on a voltage ratio detected by the upper electrodes and a voltage ratio detected by the lower electrodes. With this, switching of various functions of the electronic equipment is performed.

Also, when depressing force on upper substrate 101 is released, upper substrate 101 returns to an original form by elastic restoring forces of upper substrate 101 and elastic layer 105. With this, upper conductive layer 103 is detached from the top ends of conductive wires 106.

Such a conventional touch panel 100 as above described is disclosed in Unexamined Japanese Patent Publication No. 1984-188726, for example.

SUMMARY OF THE INVENTION

A touch panel of the present invention includes an upper substrate, a lower substrate, an elastic layer, plural conductive wires and a gel layer. An upper conductive layer is formed at a lower surface of the upper substrate, a lower conductive layer that opposes to the upper conductive layer with a space in between is formed at a top surface of the lower substrate, and the elastic layer is formed at a top surface of the lower conductive layer. The conductive wires are disposed in a manner vertically oriented with a space between themselves and the upper conductive layer, and the conductive wires are partially buried in the elastic layer. The gel layer is formed between the upper conductive layer and the elastic layer. By such a construction, the touch panel is provided in which a large depressing force for operation as required by a conventional touch panel is not required, which suffers less misoperation and assures reliable operation.

Also, a manufacturing method of a touch panel of the present invention includes a step of preparing a lower substrate having a lower conductive layer formed at a top surface thereof, a step of coating on a top surface of the lower conductive layer an elastic layer having conductive wires dispersed, a step of forming a magnetic field in the elastic layer, and a step of curing the elastic layer in a state in which the conductive wires are oriented upright in the vertical direction by using the magnetic field. With this method, the touch panel can be provided which enables reliable operation.

DETAILED DESCRIPTION OF THE INVENTION

First Exemplary Embodiment

A description on the First Exemplary Embodiment of the present invention will be given in the following referring to FIG. 1 and FIGS. 2A to 2D.

Figure 1:
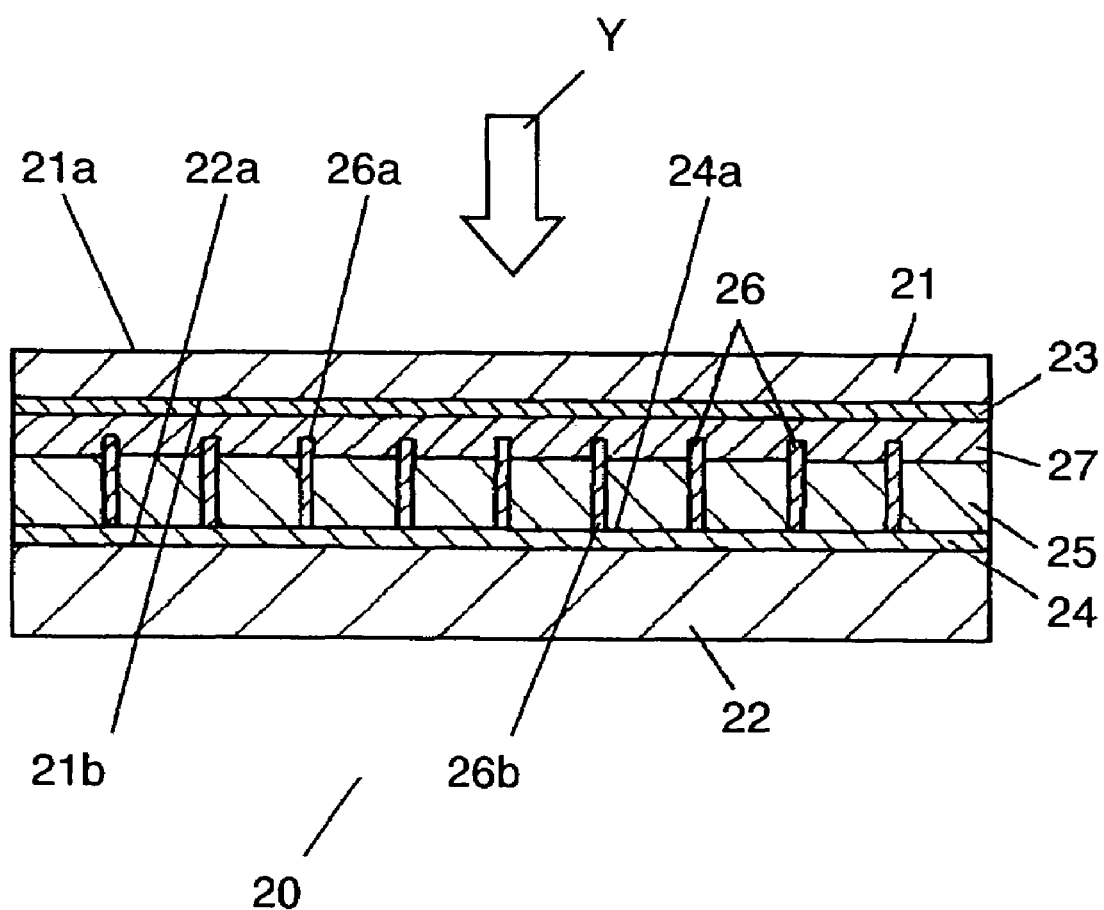
FIG. 1 is a cross-sectional view of a touch panel of the First Exemplary Embodiment of the present invention.

FIG. 1 is a cross-sectional view of a touch panel in this exemplary embodiment of the present invention. In FIG. 1, optically transparent upper substrate 21 is formed into a film-shape. And, upper substrate 21 is made of polyethylene terephthalate, polycarbonate or the like. Optically transparent lower substrate 22 is formed using glass, acrylic, polycarbonate or the like. Optically transparent upper conductive layer 23 made of indium tin oxide, tin oxide or the like is formed at lower surface 21b of upper substrate 21. Optically transparent lower conductive layer 24 made of indium tin oxide, tin oxide or the like is formed at top surface 22a of lower substrate 22. Each of upper conductive layer 23 and lower conductive layer 24 is formed by sputtering method and the like. Upper conductive layer 23 and lower conductive layer 24 are oppositely formed with a gap of about 100 μm in between.

Optically transparent elastic layer 25 made of an elastomer material such as silicone rubber or urethane rubber is formed on top surface 24a of lower conductive layer 24. Elastic layer 25 has a coefficient of elasticity of a range of $10^2$ to $10^6$ dyne/cm². Optically transparent gel layer 27 made of silicone rubber, acrylic rubber or the like is formed between elastic layer 25 and upper conductive layer 23. Gel layer 27 has a coefficient of elasticity of a range of $10^2$ to $10^3$ dyne/cm². That is, the coefficient of elasticity of gel layer 27 is smaller than that of elastic layer 25.

Also, plural conductive wires 26 made of a material such as nickel or stainless steel as about 10 μm in diameter are disposed between elastic layer 25 and gel layer 27 in a buried condition. Bottom ends 26b of conductive wires 26 are buried in elastic layer 25 and are in contact with lower conductive layer 24. Top ends 26a of conductive wires 26 are buried in gel layer 27 and face to upper conductive layer 23 with a predetermined space in between. Conductive wires 26 are arranged in a manner oriented in the vertical direction within a space between upper conductive layer 23 and lower conductive layer 24. The direction of orientation of conductive wires 26 is approximately at right angles to upper conductive layer 23 and lower conductive layer 24.

Furthermore, a pair of upper electrodes (not shown) made of silver, carbon or the like is formed at both ends of upper conductive layer 23. A pair of lower electrodes (not shown) made of silver, carbon or the like is formed at both ends of lower conductive layer 24 in a direction orthogonal to the upper electrodes. Touch panel 20 is constructed in this way.

Touch panel 20 is sealed by bonding a periphery (not shown) of upper substrate 21 and a periphery (not shown) of lower substrate 22. For bonding of upper substrate 21 and lower substrate 22, thermo-compression bonding, adhesion or a substantially frame-like spacer (not shown) with a coating adhesive at both sides is used.

Next, a description of a manufacturing method of touch panel 20 of such a construction will be given referring to FIG. 2A through FIG. 2D.

Figure 2A:
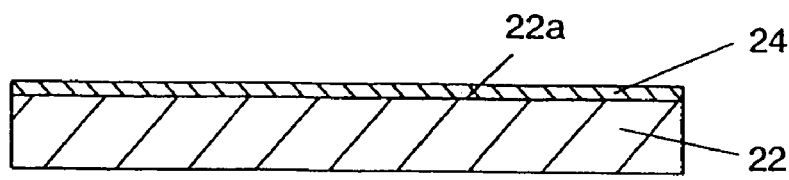
FIG. 2A is a cross-sectional view to show a manufacturing method of the touch panel shown in FIG. 1.

First, lower substrate 22 which has lower conductive layer 24 formed at top surface 22a of lower substrate 22 is prepared as shown in FIG. 2A.

Figure 2B:
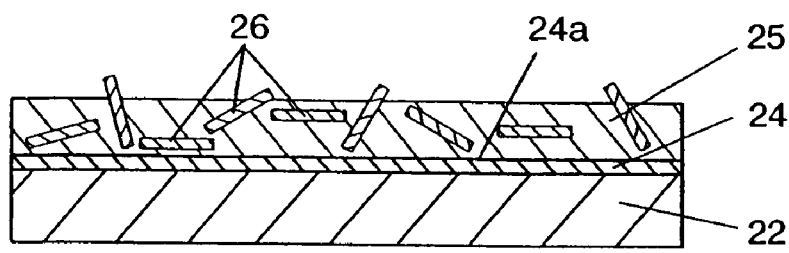
FIG. 2B is a cross-sectional view to show a manufacturing method of the touch panel shown in FIG. 1.

Next, elastic layer 25 in which plural conductive wires 26 are dispersed is coated on top surface 24a of lower conductive layer 24 as shown in FIG. 2B. Elastic layer 25 as shown in FIG. 2B is in an uncured state before curing. Plural conductive wires 26 dispersed in elastic layer 25 are in an un-oriented state before being oriented and the orientation of each individual conductive wire 26 is in a random arrangement.

Figure 2C:
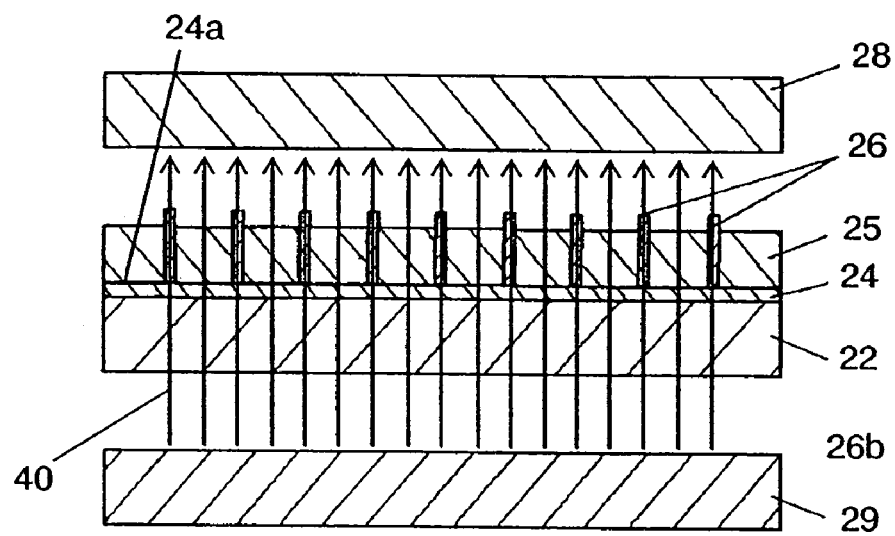
FIG. 2C is a cross-sectional view to show a manufacturing method of the touch panel shown in FIG. 1.

Subsequently, as shown in FIG. 2C, magnetic field 40 is formed in the vertical direction of elastic layer 25 using upper magnet 28 and lower magnet 29.

In FIG. 2C, two magnets, namely, upper magnet 28 and lower magnet 29, are respectively provided above and below elastic layer 25. With this arrangement, magnetic field 40 is formed in elastic layer 25. However, the magnets do not necessarily be disposed on above and below elastic layer 25. For example, if a vertically parallel magnetic field about elastic layer 25 can be made, magnetic field 40 may be formed by using upper magnet 28 only or lower magnet 29 only. It suffices that magnetic field 40 be formed at least from either of the upper side or lower side of elastic layer 25.

By magnetic field 40, plural conductive wires 26 dispersed inside elastic layer 25 are oriented upright in the vertical direction. At the same time, bottom ends 26 come into contact with lower conductive layer 24. Elastic layer 25 is cured in a state in which conductive wires 26 are oriented in the upright direction. For example, elastic layer 25 is cured by a method of heating or a method of using a curative agent.

Figure 2D:
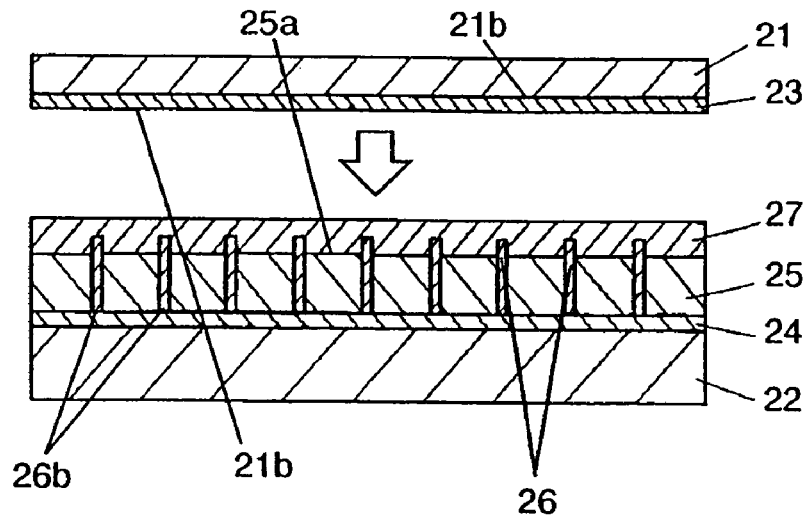
FIG. 2D is a cross-sectional view to show a manufacturing method of the touch panel shown in FIG. 1.

After elastic layer 25 has been cured, gel layer 27 is coated on top surface 25a of elastic layer 25 as shown in FIG. 2D. Gel layer 27 is formed to a thickness at which conductive wires 26 are completely buried.

Subsequently, upper substrate 21 which has upper conductive layer 23 formed at lower surface 21b of upper substrate 21 is mounted on gel layer 27, and then gel layer 27 is cured by a method of heating or a method of using a curative agent, for example. With the curing of gel layer 27, upper conductive layer 23 and gel layer 27 are bonded together, so upper substrate 21 is formed on a top of gel layer 27. Next, a periphery of upper substrate 21 and a periphery of lower substrate 22 are bonded together by thermo-compression bonding, adhesion or the like. Touch panel 20 is sealed in this way.

Additionally, the pair of upper electrodes (not shown) is formed on both ends of upper conductive layer 23. Also, the pair of lower electrodes (not shown) that is provided in orthogonal direction to the upper electrodes is formed at both ends of lower conductive layer 24. Touch panel 20 is constructed in this way.

By disposing touch panel 20 thus constructed on a front surface of a liquid crystal display device (not shown) and the like, an electronic equipment (not shown) is constructed. At the same time, the pair of upper electrodes and the pair of lower electrodes are connected to an electronic circuit (not shown) of the electronic equipment.

In the above construction, top surface 21a of upper substrate 21 is depressed with a finger or a thing such as a pen (not shown) in the direction of arrow Y for operation while visually confirmed the information displayed on the liquid crystal display device on the back side of touch panel 20. By this operation, upper substrate 21 and gel layer 27 bend, and a depressed part of upper conductive layer 23 comes into contact with top end 26a of conductive wires 26. Furthermore, when upper substrate 21 is depressed more, conductive wires 26 bend and the depressed part of upper conductive layer 23 comes into electrical contact with lower conductive layer 24 via conductive wires 26.

And, an electrical power supplied from the electronic circuit is sequentially fed to the upper electrodes and the lower electrodes. Based on a voltage ratio detected by the upper electrodes and a voltage ratio detected by the lower electrodes, the electronic circuit detects the depressed location. With this behavior, various functions of the electronic equipment can be switched.

When the depressing force being applied to upper electrode 21 is released, upper substrate 21 returns to the original state due to elastic restoring force of upper substrate 21 and gel layer 27. With this operation, upper conductive layer 23 is detached from top end 26a.

Relatively soft gel layer 27 having a small coefficient of elasticity is formed between upper conductive layer 23 and elastic layer 25 in this way. Accordingly, when touch panel 20 is operated even with a small depressing force, upper substrate 21 is easily bent. With this, the contact between upper conducting layer 23 and conducting wires 26 is easily and surely performed. That is, touch panel 20 is provided which is relatively free from wrong operation, allows reliable operation, and has improved operability.

Also, magnetic field 40 is formed from at least either from above or from below elastic layer 25, after elastic layer 25 in which conductive wires 26 had been dispersed has been coated on top surface 24a. And, elastic layer 25 is cured in a state in which conductive wires 26 are vertically oriented upright. With this, conductive wires 26 are disposed in a manner such that they are vertically oriented inside elastic layer 25 and gel layer 27. As a result, touch panel 20 which allows uniform and reliable operation is easily fabricated.

Second Exemplary Embodiment

A description of Second Exemplary Embodiment will be given in the following referring to FIG. 3.

Figure 3:
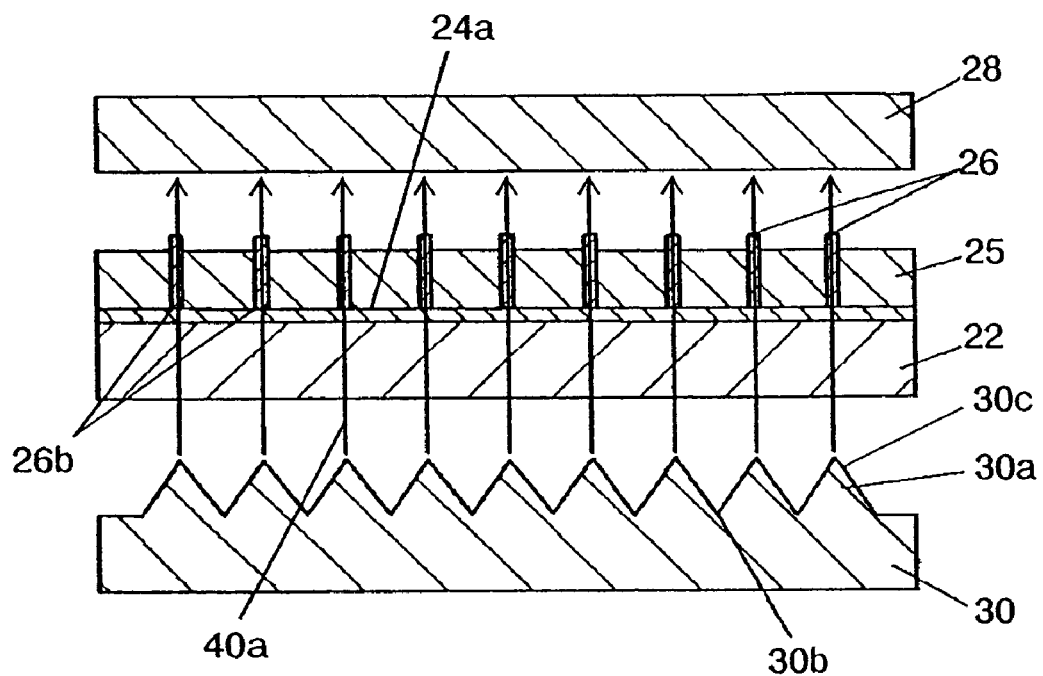
FIG. 3 is a cross-sectional view to show a manufacturing method of a touch panel of the Second Exemplary Embodiment of the present invention.
Figure 4:
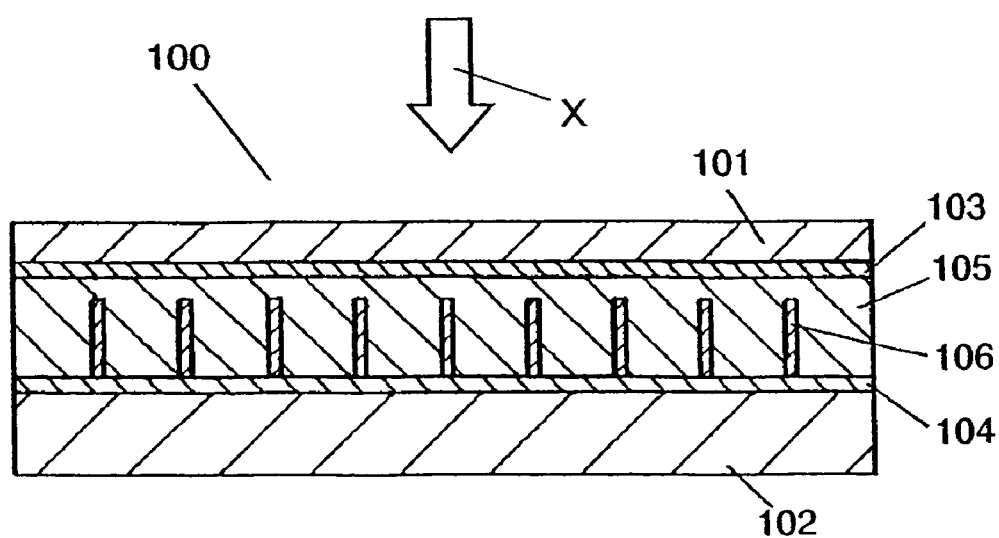
FIG. 4 is a cross-sectional view of a conventional touch panel.

FIG. 3 is a cross-sectional view showing a manufacturing method of a touch panel of the Second Exemplary Embodiment. The difference between the First Exemplary Embodiment and the Second Exemplary Embodiment lies in a method of forming the magnetic field. In the Second Exemplary Embodiment, elements similar to those in the First Exemplary Embodiment have the same reference numerals, and description of those elements is omitted.

After coating on top surface 24a elastic layer 25 in which conductive wires 26 are dispersed, magnetic field 40a is formed in elastic layer 25 by upper magnet 28 and lower magnet 30 as shown in FIG. 3. At the same time, a plurality of convex portions 30a and a plurality of concave portions 30b are regularly formed on surface 30c of lower magnet 30. Magnetic field 40a formed by lower magnet 30 has a magnetic force distribution corresponding to the locations of convex portions 30a and concave portions 30b. Conductive wires 26 dispersed in uncured elastic layer 25 are caused to orient in a state corresponding to magnetic field 40a that has a magnetic force distribution. That is, conductive wires 26 are oriented in a manner concentrated at positions corresponding to the locations of convex portions 30a. When elastic layer 25 is cured in a state in which conductive wires 26 are concentratively oriented, conductive wires are arranged at the pitch of the concave portions and convex portions.

By being able to select convex portions 30a and concave portions 30b as required, conductive wires 26 that have a predetermined distribution can be formed. Also, when convex portions 30a and concave portions 30b are formed at even intervals, conductive wires 26 are formed in a state in which they are distributed at even intervals.

As is described above, after coating on top surface 24a elastic layer 25 in which conductive wires 26 are dispersed, magnetic field 40a is formed at least from above or from below elastic layer 25. Magnetic field 40a is formed by using lower magnet 30 having convex portions 30a and concave portions 30b. Owing to this, the magnetic force that forms magnetic field 40a has a distribution. And elastic layer 25 is cured in a state in which conductive wires 26 are oriented upright in the vertical direction. With this, conductive wires 26 are arranged in a manner oriented upright inside elastic layer 25 and gel layer 27. Furthermore, conductive wires 26 are arranged with a predetermined distribution in a manner oriented upright inside elastic layer 25 and gel layer 27. As a result, density distribution of conductive wires 26 can be freely selected in accordance with the application of a touch panel and the touch panel with reliable operation can be easily fabricated.

Referring to FIG. 3, a description was given of a construction in which lower magnet 30 disposed below elastic layer 25 has convex portions 30a and concave portions 30b. However, magnetic field 40a that has a magnetic force distribution may be formed by using a magnet having convex portions and concave portions instead of upper magnet 28 disposed above elastic layer 25.

What is claimed is:

1. A touch panel comprising:
   an upper substrate having an upper conductive layer formed at a lower surface thereof;
   a lower substrate having a lower conductive layer formed on a top surface thereof, the lower conductive layer is provided opposite the upper conductive layer with a space in between;
   an elastic layer formed at a top surface of the lower conductive layer;
   a plurality of conductive wires disposed in a manner oriented in the vertical direction and at a distance from the upper conductive layer, a part of the conductive wires being buried in the elastic layer; and
   a gel layer extending from a top surface of the elastic layer to a bottom surface of the upper conductive layer.

2. The touch panel of claim 1,
   wherein the coefficient of elasticity of the gel layer is smaller than the coefficient of elasticity of the elastic layer.

3. The touch panel of claim 1,
   wherein the conductive wires are disposed with a predetermined distribution.

4. The touch panel of claim 2,
   wherein the coefficient of elasticity of the elastic layer is 10 times or more than 10 times of the coefficient of elasticity of the gel layer.

5. A touch panel comprising:
   an upper substrate having an upper conductive layer formed at a lower surface thereof;
   a lower substrate having a lower conductive layer formed on a top surface thereof, the lower conductive layer is provided opposite the upper conductive layer with a space in between;
   an elastic layer formed at a top surface of the lower conductive layer;
   a plurality of conductive wires disposed in a manner oriented in the vertical direction and at a distance from the upper conductive layer, a part of the conductive wires being buried in the elastic layer; and
   a gel layer formed between the upper conductive layer and the elastic layer,
   wherein the gel layer has a coefficient of elasticity in the range of $10^2$ to $10^3$ dyne/cm$^2$.

6. A manufacturing method of a touch panel comprising the steps of:
   preparing a lower substrate having a lower conductive layer formed at a top surface thereof;

coating on the top surface of the lower conductive layer an elastic layer having conductive wires dispersed;

forming a magnetic field in the elastic layer;

curing the elastic layer in a state in which the conductive wires are vertically oriented upright by using the magnetic field;

preparing an upper substrate having an upper conductive layer formed at a lower surface thereof; and forming a gel layer extending from a top surface of the elastic layer to a bottom surface of the upper conductive layer.

7. The manufacturing method of a touch panel of claim 6, wherein the coefficient of elasticity of the gel layer is smaller than the coefficient of elasticity of the elastic layer.

8. The manufacturing method of a touch panel of claim 7, wherein the coefficient of elasticity of the elastic layer is 10 times or more than 10 times of the coefficient of elasticity of the gel layer.

9. A manufacturing method of a touch panel comprising the steps of:

preparing a lower substrate having a lower conductive layer formed at a top surface thereof;

coating on the top surface of the lower conductive layer an elastic layer having conductive wires dispersed;

forming a magnetic field in the elastic layer;

curing the elastic layer in a state in which the conductive wires are vertically oriented upright by using the magnetic field, forming a gel layer on the elastic layer; and forming on the gel layer an upper substrate having an upper conductive layer formed at a lower surface thereof, wherein the gel layer has a coefficient of elasticity in the range of $10^2$ to $10^3$ dyne/cm$^2$.

10. A manufacturing method of a touch panel comprising the steps of:

preparing a lower substrate having a lower conductive layer formed at a top surface thereof;

coating on the top surface of the lower conductive layer an elastic layer having conductive wires dispersed;

forming a magnetic field in the elastic layer; and curing the elastic layer in a state in which the conductive wires are vertically oriented upright by using the magnetic field, wherein the magnetic field is formed in the elastic layer using a magnet having concave portion and convex portion on a surface of the magnet.

* * * * *

UNITED STATES PATENT AND TRADEMARK OFFICE
CERTIFICATE OF CORRECTION

PATENT NO. : 7,406,881 B2  Page 1 of 1
APPLICATION NO. : 11/453505
DATED : August 5, 2008
INVENTOR(S) : Koji Tanabe It is certified that error appears in the above-identified patent and that said Letters Patent is hereby corrected as shown below:

<u>Cover Page,</u>

Item (30), Foreign Application Priority Data, "Jun. 20, 2003" should read -- June 20, 2005 --.

Signed and Sealed this

Sixteenth Day of December, 2008

JON W. DUDAS
*Director of the United States Patent and Trademark Office*